(12) United States Patent
Maeda et al.

(10) Patent No.: US 7,549,776 B2
(45) Date of Patent: Jun. 23, 2009

(54) SCUFF PLATE

(75) Inventors: Hideto Maeda, Aichi-ken (JP);
Daiichiro Kawashima, Aichi-ken (JP);
Tatsuo Ito, Aichi-ken (JP); Tatsuya Oba, Aichi-ken (JP); Mitsuru Kamikatano, Sakura (JP); Kohki Ishikawa, Tokyo (JP)

(73) Assignees: Toyoda Gosei Co., Ltd., Aichi-pref. (JP); Fujikura Ltd., Tokyo (JP)

( * ) Notice: Subject to any disclaimer, the term of this patent is extended or adjusted under 35 U.S.C. 154(b) by 0 days.

(21) Appl. No.: 11/602,456

(22) Filed: Nov. 21, 2006

(65) Prior Publication Data
US 2007/0133214 A1 Jun. 14, 2007

(30) Foreign Application Priority Data
Nov. 24, 2005 (JP) ............................. 2005-338882

(51) Int. Cl.
*F21V 15/00* (2006.01)
*G09F 13/04* (2006.01)
(52) U.S. Cl. .................. 362/362; 362/364; 362/495; 362/620; 40/564
(58) Field of Classification Search ................ 362/625, 362/626, 632, 633, 362, 364, 608, 615, 616, 362/619, 620, 367, 495; 40/564, 579, 583
See application file for complete search history.

(56) References Cited
U.S. PATENT DOCUMENTS
6,334,691 B1 * 1/2002 Suzuki et al. ............... 362/608
6,522,371 B1 * 2/2003 Sakamoto et al. ............ 349/58
6,607,297 B2 * 8/2003 Egawa ....................... 362/551
6,805,468 B2 * 10/2004 Itoh et al. ................... 362/362
6,889,456 B2 * 5/2005 Shibata et al. ............... 40/546
6,971,758 B2 * 12/2005 Inui et al. ................... 362/602
7,206,040 B2 * 4/2007 Kano ......................... 349/67
7,217,025 B2 * 5/2007 Kim et al. ................... 362/610
2002/0131261 A1 9/2002 Inui et al.
2006/0227572 A1 * 10/2006 Chen ......................... 362/633

FOREIGN PATENT DOCUMENTS
CN 2663228 12/2004
CN 2686928 3/2005
JP A-2001-163117 6/2001

OTHER PUBLICATIONS
Office Action dated Jul. 4, 2008 in corresponding Chinese patent application No. 200610145314.6 (and English translation).

* cited by examiner

*Primary Examiner*—John A Ward
(74) *Attorney, Agent, or Firm*—Posz Law Group, PLC

(57) ABSTRACT

A scuff plate of the invention is a scuff plate which has a luminous unit of which a side surface of side surfaces forms a luminous surface, a light source unit which emits light to the luminous unit, and a light guiding unit which is disposed in such a manner that a side surface thereof faces the luminous surface, wherein the light guiding unit has a luminous surface portion which expands in an intersecting direction relative to a front surface thereof. The scuff plate of the invention provides a scuff plate which has superior design properties without increasing the thickness of the whole thereof.

13 Claims, 2 Drawing Sheets

SCUFF PLATE

BACKGROUND OF THE INVENTION

1. Field of the Invention

The present invention relates to a scuff plate and more particularly to a scuff plate which displays a specific shape by light from a light source.

2. Related Art

In recent years, a scuff plate is mounted on an edge portion of a door opening in a vehicle to protect a side sill portion. In addition, the scuff plate is used to obtain a decorative effect by allowing light to be emitted therefrom in a designed pattern such as characters.

A light emitting scuff plate is disclosed in, for example, JP-A-2001-163117. In JP-A-2001-163117, a scuff plate is described which has a light source, a light guiding plate, a light reflecting layer disposed on a rear surface of the light guiding plate and a cover having a light transmitting opening which is formed into a desired shape.

With the conventional scuff plate which is configured as described above, however, there has been a problem that the thickness thereof is increased. Due to the position where it is mounted, the scuff plate is required not to restrict the motion of the legs of a passenger when he or she gets in or out of a vehicle. In addition, when the scuff plate is mounted on the side sill portion, a wiring harness is disposed on a rear surface side (in an interior of the side sill portion) of the scuff plate. Namely, the scuff plate has needed to reduce its thickness to a predetermined thickness or thinner.

In the conventional scuff plate, light from the light source such as an LED which is disposed to a side of the light guiding plate is reflected to a front surface of the scuff plate (upwards) by the light reflecting layer which is disposed on a rear surface (a lower side) of the light guiding plate so that the light so reflected is allowed to transmit through the light transmitting opening in the cover. Namely, in the conventional scuff plate, in order to secure the quantity of light which transmits through the light transmitting opening, the light guiding plate has been required to have a thickness which is equal to or thicker than that of the light source. Namely, since the light guiding plate is required to have a thickness which is equal to or thicker than a certain thickness and most of the thickness of the scuff plate is occupied by the light guiding plate, the thickness of the scuff plate itself has also been increased.

Furthermore, in the conventional scuff plate, the light guiding plate is formed into a flat plate-like shape, and irregularities are not formed on the light guiding plate itself. Since no irregularities cannot be formed on the light guiding plate, the shape displayed by the scuff plate tends to lack a three-dimensional effect. With the lack of such a three-dimensional effect, the appearance of the scuff plate has been deteriorated not only at night when light is emitted but also in a day when no light is emitted therefrom.

In addition, in the conventional scuff plate, with the light source unit disposed at a longitudinal end portion of the light guiding plate, there has also been caused a problem that when a distance from the light source to the light transmitting opening is increased, the quantity of light that is transmitted through the light transmitting opening is reduced. In short, there is caused an unevenness in luminance, leading to a large reduction in the appearance of the scuff plate.

SUMMARY OF THE INVENTION

The invention was made in view of the situations, and a problem to be solved thereby is to provide a scuff plate which enhances the appearance thereof.

With a view to solving the problem, there have been carried out several studies on scuff plates to reach the invention.

According to the invention, there is provided a scuff plate having a luminous unit which has a prism-like shape formed to enable the transmission of light therethrough and of which one of side surfaces forms a luminous surface, a light source unit for emitting light to illuminate one of axial end faces of the luminous unit, and a light guiding unit which has a plate-like shape adapted to transmit light therethrough and which is disposed to face the luminous surface of the luminous unit on a side surface thereof, wherein the light guiding unit has a luminous surface portion which expands in an intersecting direction relative to a front surface thereof.

With the luminous surface portion formed into a desired three-dimensionally designed shape, the scuff plate of the invention is allowed to have a three-dimensional design. This three-dimensional effect can be obtained when the luminous surface portion is not only luminous but also not luminous. Namely, the appearance is enhanced in both the cases.

Furthermore, according to the scuff plate of the invention, since the luminous unit is designed to shed light to the light guiding unit which has the luminous surface portion which displays a designed pattern, there is no direct relation between the thickness of the light guiding unit and the size of the light source unit. Namely, the thickness of the light guiding unit does not have to be increased even when the size of the light source unit is increased. Namely, the overall thickness of the scuff plate can be suppressed to a reduced thickness. In other words, the scuff plate of the invention does not restrict the motion of the legs of the passenger when he or she gets in or out of the vehicle and can secure a wide space for the wiring harness that is mounted on the rear surface side thereof.

DETAILED DESCRIPTION OF THE PREFERRED EMBODIMENTS

Figure 1:
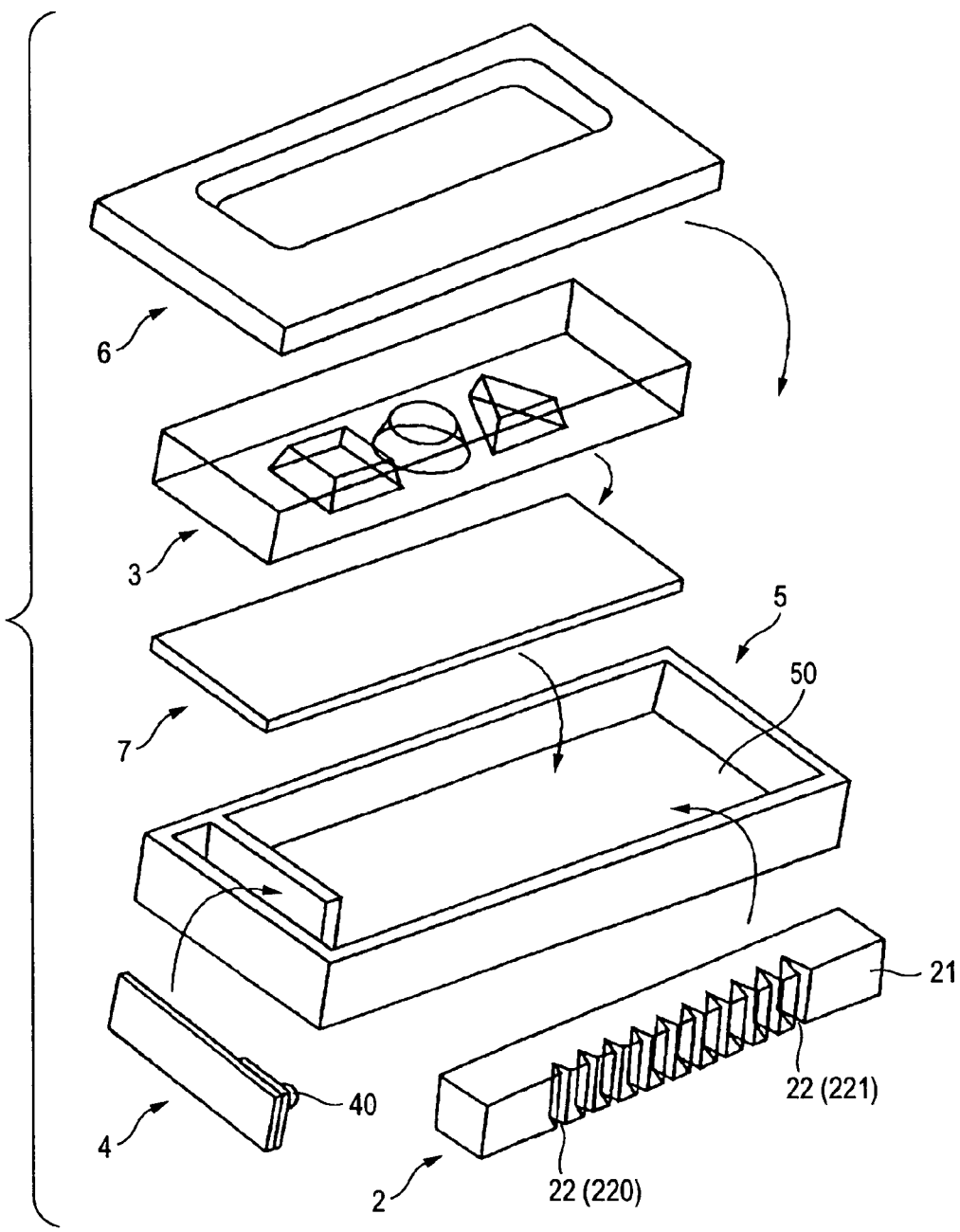
FIG. 1 is an exploded view of a scuff plate of Embodiment 1.

A scuff plate of the invention has a luminous unit, a light source unit and a light guiding unit.

The luminous unit is a member which has a prism-like shape formed to enable the transmission of light therethrough and of which one of side surfaces forms a luminous surface. By having the prism-like shape formed to enable the transmission light therethrough, at least one side surface of the luminous unit becomes luminous when one of axial end faces thereof is illuminated.

The light source unit is a member for emitting light to illuminate the one of the axial end faces of the luminous unit. Namely, the light source unit emits light, and the light so emitted by the light source unit illuminates the luminous unit, whereby the one side surface of the luminous unit (the luminous surface) becomes luminous.

The light guiding unit is a member which has a plate-like shape adapted to transmit light therethrough and which is disposed to face the luminous surface of the luminous unit on a side surface thereof. The side surface of the light guiding unit is illuminated by the light emitted from the luminous surface of the luminous unit. The light guiding unit becomes luminous when the side surface thereof is illuminated by the light emitted from the luminous unit.

In addition, in the scuff plate of the invention, the light guiding unit has a luminous surface portion which expands in an intersecting direction relative to a front surface thereof. The luminous surface portion deflects light that has entered the light guiding unit from the side surface of thereof which faces the luminous surface in a direction towards the front surface of the light guiding unit (or in a thickness direction of the light guiding unit). The scuff plate becomes luminous by virtue of the deflection of light like this. The luminous surface portion is preferably provided with an interface provided within the light guiding plate. Namely, the luminous surface portion is preferably an interface provided with a different material. This interface changes the traveling direction of light which is transmitted through the light guiding unit. The traveling direction of the light that is transmitted through the light guiding unit is changed to the direction towards the front surface of the light guiding unit at the luminous surface portion due to the light guiding unit having the luminous surface portion in an interior in the thickness direction thereof. As a result, a planar luminous element of the invention becomes luminous on the luminous surface portion. In the scuff plate of the invention, since the luminous surface portion is formed in an inclined fashion, a pattern formed by the luminous surface portion when it becomes luminous is allowed to look three-dimensionally.

The luminous surface portion only has to expand in the intersecting direction relative to the front surface of the light guiding unit, and no particular limitation is imposed on an angle that is formed between the expanding surface of the luminous surface portion and the front surface of the light guiding unit. An angle of 30 to 40° is preferably formed between the expanding surface of the luminous surface portion and the front surface of the light guiding unit.

Furthermore, since the light guiding unit has the plate-like shape adapted to transmit light therethrough, the luminous surface portion which is inclined from the front surface of the light guiding unit becomes visible. Then, the shape formed by the luminous surface portion becomes visible three-dimensionally. Namely, in a day time or the like when the light source unit emits no light, the shape of the luminous surface portion becomes visible three-dimensionally, whereby the design properties of the scuff plate is enhanced.

The luminous surface portion is preferably provided with an interface formed as a result of the abutment of members having different refractive indexes. When light passes through an interface between two materials having different refractive indexes, the traveling direction of the light is changed due to a difference between the refractive indexes of the two materials. In the planar luminous element of the invention, due to the luminous surface portion being provided with the interface between the members having the different refractive indexes, the traveling direction of the light which has traveled into the interior of the light guiding unit is changed to the direction towards the front surface of the light guiding unit at the luminous surface portion (the interface). That is to say, the luminous surface portion becomes luminous. Then, the light whose traveling direction has been changed becomes visible via the front surface portion as the luminance of the planar luminous element.

The luminous surface portion is preferably formed by an interface which is provided with two materials having different refractive indexes, and one of the materials is preferably a material which is the same material as that used for the portion on to which light from the light source unit is shed. That is to say, by make up the luminous surface portion of the material that is the same material as that of the portion on to which light from the light source unit is shed, light shed on to the luminous surface portion is transmitted sufficiently without being caused to scatter. There is no specific limitation on a material used as the one of the two material, provided that the material can transmit light therethrough. For example, such materials as resin and glass can be raised. However, resin is preferred, and an acrylic resin is more preferred.

There is no specific limitation on a material used as the other of the two materials having different refractive indexes, provided that the material can produce a difference in refractive index via the luminous surface portion. For example, such materials as resin, glass and gas such as air can be raised.

In the scuff plate of the invention, since the luminous unit is disposed to the side of the light guiding unit, the thickness of the scuff plate can be suppressed to a reduced thickness.

In the scuff plate of the invention, the luminous unit and the light guiding unit may be integrated into a single unit or formed as separate units, provided that they are configured such that light shed from the luminous surface portion of the luminous unit illuminates the side surface of the light guiding unit uniformly. The luminous unit and the light guiding unit are preferably separate from each other.

The luminous surface portion is preferably provided with a side wall surface of a recessed portion which is provided on the front surface and/or a rear surface of the light guiding unit. The side wall surface of the recessed portion expands in the intersecting direction relative to the front surface of the light guiding unit. That is to say, the side wall surface of the recessed portion which is provided on the light guiding unit forms the luminous surface portion. Due to the side wall surface of the recessed portion making up the luminous surface portion, the luminous surface portion becomes luminous by a difference in refractive index between the material making up the light guiding unit and air.

There is no limitation on the sectional shape of the recessed portion. That is to say, the recessed portion only has to have a sectional shape which can define a side wall surface which can make up the luminous surface portion. Here, the width of the side wall surface (the depth from a front surface) of the recessed portion is preferably long. That is to say, the deeper the recessed portion becomes, the more light that is transmitted through the light guiding unit is transmitted through the luminous surface portion, and the quantity of light that travels in the direction towards the front surface of the planar luminous element is increased, whereby the luminous effect of the planar luminous element is enhanced. Note that the recessed portion may have or may not have a bottom surface portion, provided that the recessed portion has the sectional shape having the side wall surface which can make up the luminous surface portion. In addition, the side wall surface is not necessarily rectilinear. That is to say, the side wall surface may be curved. That is, the sectional shape of the recessed portion may be of any of an angled shape, U-shape and V-shape.

The luminous unit has preferably an opposite surface which is disposed opposite to the luminous surface, a recessed portion being formed in the opposite surface. Due to the recessed portion being formed on the opposite surface of the luminous unit, light shed on to an end face of the luminous unit is allowed to travel in a direction towards the luminous surface. Namely, the traveling direction of light which is shed on to the end face of the luminous unit is changed to a direction towards the luminous surface. There is no limitation on the sectional shape of the recessed portion, provided that the recessed portion is formed into a shape which can change the traveling direction of light to the direction towards the luminous surface. The recessed portion is preferably provided with a plurality of elongated grooves each having an inclined surface which expands in a direction which intersects a surface of the opposite surface.

The depth of the recessed portion preferably. increases as the recessed portion gets distant from the light source unit. Namely, in the invention, the quantity of light whose traveling direction is bent by the function of the recessed portion is increased as the distance from the light source unit to the recessed portion is prolonged. In addition, the quantity of light that travels in the luminous unit is reduced as light travels farther from the light source unit. Namely, in the invention, the quantity of light that travels in the direction towards the luminous surface portion is increased by virtue of the change in depth of the recessed portion even though light travels farther from the light source unit. As a result, the luminous surface portion can shed light uniformly.

The light guiding unit preferably has a belt-like shape, and one of side surfaces of the belt-like shape faces the luminous unit. In the scuff plate of the invention, light from the luminous surface portion is shed in a width direction from the side surface of the belt-shaped light guiding unit, whereby the light guiding unit becomes luminous uniformly.

The scuff plate preferably has a cover which is disposed on the front surface of the light guiding unit and which covers at least the luminous unit and the light source unit. By covering at least the luminous unit and the light source unit, the luminous unit and the light source unit are not exposed, and other light than light from the light guiding unit becomes invisible, whereby the appearance of the scuff plate is enhanced. In addition, since the scuff plate has the cover, even though the legs of a passenger of the vehicle are brought into touch with the scuff plate when he or she gets into or out of the vehicle, there is caused no risk that the scuff plate is damaged.

The light guiding unit preferably has a reflecting layer for reflecting light to a light guiding plate on a rear surface thereof. By having the reflecting layer, light that travels in a direction towards the rear surface of the light guiding unit is reflected on the reflecting layer so as to be shed back to the light guiding unit. In addition, the appearance of the scuff plate is enhanced which results when the light guiding unit is seen with no light shed therefrom. There is no limitation on the configuration of the reflecting layer, and hence, the reflecting layer may be integrated with the light guiding unit or may be separated therefrom.

The scuff plate of the invention can be configured in the same way as the conventional scuff plate except for its configuration that has been described heretofore.

Embodiment

Hereinafter, the invention will be described using an embodiment.

A scuff plate was manufactured as an embodiment of the invention.

Figure 2:
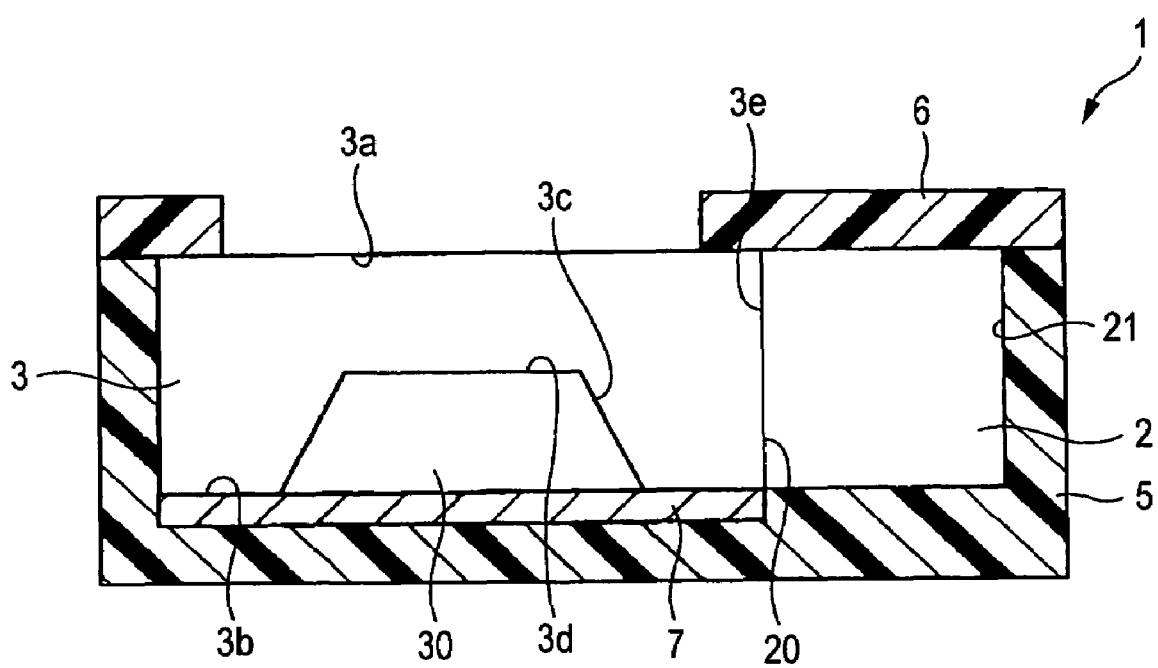
FIG. 2 is a sectional view of the scuff plate of Embodiment 1.

An exploded view of a scuff plate of this embodiment is shown in FIG. 1, and a sectional view thereof is shown in FIG. 2. Note that FIG. 2 is a diagram showing a section taken along a substantially central portion of a light guiding plate 3.

The scuff plate 1 of the invention has a luminous member 2, a light guiding plate 3, a light source unit 4, a case, a cover 6 and a rear reflecting plate 7.

The luminous member 2 is provided with a prism-shaped transparent acryl having a square cross section. One of side surfaces of the prism forms a luminous surface 20. In addition, elongated grooves 22 which extend in a normal direction to a direction in which the luminous member 2 extends are formed on an side surface 21 which is opposite to the luminous surface 20 along a length direction of the luminous member 2. The elongated grooves 22 are formed such that the depth thereof is deepened from one end to the other end of the luminous member 2 in an axial direction thereof. Namely, the depth of an elongated groove 220 lying in one end portion (a depth from a front surface to a bottom surface of the side surface 21) is formed shallower than the depth of an elongated groove 221 lying in the other end portion of the luminous member 2 (a depth from the front surface to the bottom surface of the side surface 21).

The light guiding plate 38 is provided with a belt-shaped transparent acryl plate having an axial length which substantially coincide with the length of the luminous member 2. The light guiding plate 3 has recessed portions 30 which are recessed from a rear surface 3b side thereof. The recessed portions 30 are each formed to have a predetermined shape. In this embodiment, the recessed portions 30 are formed into shapes "□○△" as shown in FIG. 1 exemplifying any alphabetical characters such as "LED". In addition, a side wall surface 3c which defines each of the recessed portions 30 is formed inclined relative to a front surface 3a of the light guiding plate 3. Additionally, a bottom surface 3d which defines the recessed portion 30 is formed parallel to the front surface 3a.

The light guiding plate 3 is disposed in such a state that a side surface 3e which extends in an axial direction thereof faces the luminous surface 20 of the luminous member 2.

The light source unit 4 is provided with a light emitting diode 40. The light emitting diode 40 is disposed in such a state that the diode faces an axial end face of the luminous member 2. The light emitting diode 40 is electrically connected to a power supply (not shown) which is provided outside the scuff plate 1 so as to be made to emit light by power supplied from the power supply. Light emitted by the light emitting diode 40 is shed on to the axial end face of the luminous member 2.

The rear reflecting plate 7 is disposed in such a state that the reflecting plate faces the rear surface 3b of the light guiding plate 3. The rear reflecting plate 7 is provided with an aluminum plate. In addition, a side reflecting layer (not shown) which reflects light is provided in positions which face side surfaces of the light guiding plate 3 except for the side surface 3e.

The case 5 holds the light luminous member 2, the light guiding plate 3 and the light source unit 4 and fixes them in place. The case 5 has a holding portion 50 which has an angled section and holds the light guiding plate 3 and the light emitting diode 40 in an interior of the holding portion 50. In addition, the cover 6 is hermetically joined to an opening of the holding portion 50 so as to be fixed thereto.

When fixed to the case 5, the cover 6 uncovers a portion of the light guiding plate 3 where the recessed portions 30 are formed and covers the remaining portion thereof. Namely, the scuff plate 1 of the invention has a configuration in which the luminous member 2, the light source unit 4 and the rear reflecting plate 7 are accommodated in an interior thereof by the case 5 and the cover 6.

Hereinafter, the luminance of the scuff plate 1 of the embodiment will be described.

Firstly, in the scuff plate 1 of the embodiment, when the light emitting diode 40 is energized, the light emitting diode 40 is made to emit light. Light emitted from the light emitting diode 40 is shed on to the one end face of the luminous member 2. The light shed on to the luminous member 2 travels in the interior of the luminous member 2 in an axial direction thereof.

The light traveling axially in the interior of the luminous member 2 reaches the side wall surfaces of the elongated grooves 22 formed in the luminous member 2. The light reaching the side wall surfaces is bent in the direction towards the luminous surface 20 by the function of the side wall surfaces. As this occurs, the traveling direction of light that is transmitted through the side wall surfaces is bent by a difference in refractive index between the acrylic resin which forms the luminous member 2 and outside air and the inclination of the side wall surface.

In addition, the function of the elongated grooves 22 is such that the quantity of light whose traveling direction is bent is increased as the depth of the elongated grooves 22 gets deeper. Namely, since the elongated grooves 22 formed on the luminous member 2 are formed such that the grooves get deeper as the distance from the light emitting diode 40 thereto is extended, the luminous surface 20 can obtain a sufficient quantity of light also in the other end portion thereof. Namely, the luminous surface 20 becomes luminous uniformly in the axial direction of the luminous member 2.

Then, the light shed from the luminous surface of the luminous member 2 illuminates the side surface 3e, which is one of the side surfaces, of the light guiding plate 3, so as to travel in the interior of the light guiding plate 3.

The light traveling through the interior of the guiding plate 3 then reaches the side wall surface 3c of each of the recessed portions 30 of the light guiding plate 3. The light that has reached the side wall surface 3c is transmitted through the side wall surface 3c, so as to exit from the light guiding plate 3 to the outside thereof (into the interior of the recessed portion 30). As this occurs, the light that is transmitted through the side wall surface 3c is made to travel in the direction towards the front surface of the scuff plate 1 due to the difference in refractive index between the acrylic resin which forms the light guiding plate 3 and the inclination of the side wall surface 3c. Here, the side wall surface 3c is formed to have a predetermined shape, and the side wall surface 3c becomes visible from the front surface of the scuff plate 1 in such a state that the side wall surface is being luminous more intensely, whereby the side wall surface 3c that is formed into the predetermined shape becomes visible as a three-dimensional design. In addition, since the luminous surface 20 of the luminous member 2 becomes luminous uniformly, light reaches uniformly each of the recessed portions 30 which are aligned in the axial direction of the luminous member 2. Light is shed to the recessed portions 30 uniformly irrespective of their axial locations from the light source unit 4. This means that the quantity of light which is shed from the respective recessed portions 30 becomes uniform. Namely, the scuff plate of the embodiment is designed to be seen three-dimensionally. Namely, the scuff plate is made to exhibit a better appearance when it is illuminated.

Of the light that travels in the interior of the light guiding plate 3, light that is made to scatter in the interior of the light guiding plate 3 to travel in a direction towards the rear surface 3b of the light guiding plate 3 is reflected by the rear reflecting plate 7 provided in such a manner as to face the rear surface 3b of the light guiding plate 3, so as to be reflected back to the light guiding plate 3, whereby the light so reflected is allowed to travel in the interior of the light guiding plate 3 again.

In addition, the light that travels through the light guiding plate to reach the side surface is reflected by the side reflecting layers to travel in the interior of the light guiding plate 3 again.

As has been described heretofore, in the scuff plate 1 of the embodiment, light emitted from the light emitting diode 40 is shed from the luminous member 2 to the light guiding plate 3. Then, the side wall surface 3c is made to make up the luminous surface by the light so shed to the light guiding plate 3. The scuff plate 1 of the embodiment is made to have the three-dimensional design when illuminated. Namely, the appearance resulting then is enhanced.

In addition, even in such a state that the light emitting diode 40 emits no light, the scuff plate 1 of the embodiment transmits sunlight from the outside, and the sunlight so transmitted is then reflected by the rear reflecting plate 7. Light reflected by the rear reflecting plate 7 is transmitted through the light guiding plate 3 so as to become visible again. Namely, by having the rear reflecting plate 7, the scuff plate 1 of the embodiment can also enhance the appearance thereof when it is not illuminated.

Additionally, the scuff plate 1 of the embodiment has the configuration in which the members required for luminance thereof are accommodated between the case 5 and the cover 6 and is hence constructed compact. Furthermore, since the configuration is adopted in which the luminous member 2 sheds light to the light guiding plate 3 which has the recessed portions 30 adapted to display the predetermined design, the thickness of the light guiding plate 3 and the size of the light source unit 4 have no direct relation with each other. Namely, even though the size of the light source unit 4 is increased, the thickness of the light guiding plate 3 does not have to be increased. In addition, since light can be shed to the recessed portions 30 by the luminous member 2, even though the thickness of the light guiding plate 3 is increased, the size of the light source unit 4 does not have to be increased. Since the configuration is adopted in which the light source unit 24 is disposed at the widthways end portion of the scuff plate1, the increase in thickness of the whole of the scuff plate 1 is suppressed by increasing the thickness thereof partially at the portion where the light source unit 4 is disposed. Namely, with the scuff plate 1 of the embodiment, when it is mounted on the vehicle, no restriction is imparted to the motion of the legs of the passenger who gets in or out of the vehicle, and a wide space can be secured for the rear surface side thereof for the wiring harness.

What is claimed is:

1. A scuff plate having:
    a luminous unit which has a prism-like shape formed to enable a transmission of light therethrough and of which one of side surfaces forms a luminous surface;
    a light source unit for emitting light to illuminate one of axial end faces of the luminous unit; and
    a light guiding unit which has a plate-like shape adapted to transmit light therethrough and which is disposed to face the luminous surface of the luminous unit on a side surface thereof, wherein
    the light guiding unit has recessed portions, which are recessed from a rear of the light guiding unit,
    at least one of the recessed portions has a luminous surface portion, which is inclined relative to a front surface thereof, and
    the recessed portions are aligned in a direction that is parallel to a longitudinal axis of the luminous unit.

2. A scuff plate according to claim 1, wherein the luminous unit has an opposite surface which is disposed opposite to the luminous surface, a recessed portion being formed in the opposite surface.

3. A scuff plate according to claim 2, wherein a depth of the recessed portion increases as the recessed portion gets distant from the light source unit.

4. A scuff plate according to claim 1, wherein the light guiding unit has a belt-like shape, and one of side surfaces of the belt-like shape faces the luminous unit.

5. A scuff plate according to claim 1, having a cover which is disposed on the front surface of the light guiding unit and which covers at least the luminous unit and the light source unit.

6. A scuff plate having:
- a luminous unit which has a prism-like shape and which transmits light, wherein one surface of the luminous unit is a luminous surface;
- a light source for emitting light at an axial end face such tat light from the light source enters the axial end face of the luminous unit; and
- a light guiding unit, which has a plate-like shape and which transmits light, is located such that a side surface of the light guiding unit faces the luminous surface of the luminous unit, wherein
- the light guiding unit has a front surface and a rear surface, which are opposite to one another and which intersect the side surface,
- the light guiding unit has a plurality of recesses, which are recessed front the rear surface of the light guiding unit,
- at least one of the recessed portions has a surface that is inclined relative to the front surface of the light guiding unit, and the inclined surface forms a luminous surface portion that directs light from the luminous unit toward the front surface of the light guiding unit, and
- the recessed portions are spaced apart from one another in a direction that is parallel to a longitudinal axis of the luminous unit.

7. The scuff plate according to claim 6, wherein grooves are formed in a surface of the luminous unit that is opposite to the luminous surface.

8. The scuff plate according to claim 7, wherein a depth of the grooves increases as a distance from the light source increases.

9. The scuff plate according to claim 6, further including a cover, which is located on the front surface of the light guiding unit and which covers at least the luminous unit and the light source unit.

10. The scuff plate according to claim 7, wherein the front surface and the rear surface of the light guiding unit are flat and parallel.

11. The scuff plate according to claim 7, wherein the luminous unit and the light guiding unit have the same thickness, as measured in a direction from the front surface to the rear surface of the light guiding unit.

12. The scuff plate according to claim 7, wherein the inclined surface is one of a plurality of inclined surfaces of the recesses, respectively, that form luminous surface portions that direct light from the luminous unit toward the front surface of the light guiding unit.

13. The scuff plate according to claim 7, wherein the front surface of the light guiding unit is adapted to present a three-dimensional image of shapes of the recesses to a viewer facing the front surface of the light guiding unit.

* * * * *